United States Patent [19]

Goerne et al.

[11] Patent Number: 4,797,901

[45] Date of Patent: Jan. 10, 1989

[54] CIRCUIT ARRANGEMENT FOR TESTING A PASSIVE BUS NETWORK WITH THE CARRIER SENSE MULTIPLE ACCESS WITH COLLISIONS DETECTION METHOD

[75] Inventors: Jan Goerne; Joseph Kozilek; Steven Moustakas, all of Munich, Fed. Rep. of Germany

[73] Assignee: Siemens Aktiengesellschaft, Berlin and Munich, Fed. Rep. of Germany

[21] Appl. No.: 898,994

[22] Filed: Aug. 22, 1986

[30] Foreign Application Priority Data

Aug. 22, 1985 [DE] Fed. Rep. of Germany ....... 3530262

[51] Int. Cl.$^4$ .............................................. H04J 3/02
[52] U.S. Cl. ..................................... 375/10; 370/85; 340/825.5
[58] Field of Search ................ 375/7, 10; 370/85, 86, 370/89; 455/58, 67; 340/825.5

[56] References Cited

U.S. PATENT DOCUMENTS

| | | | |
|---|---|---|---|
| 4,380,088 | 4/1983 | Lipcon | 340/825.5 |
| 4,384,363 | 5/1983 | Lipcon | 455/58 |
| 4,494,113 | 1/1985 | Yamaoka et al. | 370/85 |
| 4,638,311 | 1/1987 | Gerety | 340/825.5 |
| 4,661,950 | 4/1987 | Kobayashi et al. | 370/85 |

FOREIGN PATENT DOCUMENTS 0133139 2/1985 European Pat. Off. .

OTHER PUBLICATIONS

Coleman et al., "The Implementation... VLSI," Mini--Micro Conference Record, Nov. 1983, pp. 1-18.
"RS 232 Line Indicator" Elektor, vol. 6, No. 7, Jul.-/Aug. 1980, pp. 7-30.
Balakrishnan, "Transceiver and Serial . . . Budget LAN," Electronics Design, vol. 32, No. 15, Jul. 1984, pp. 193-198.

Primary Examiner—Robert L. Griffin
Assistant Examiner—Stephen Chin
Attorney, Agent, or Firm—Hill, Van Santen, Steadman & Simpson

[57] ABSTRACT

A circuit arrangement is provided for testing a passive bus network system which comprises stations which are connectible to a coaxial cable segment via media adapter units, the stations realizing the data packet exchange via the coaxial cable segment with carrier sense multiple access with collision detection access method. In conjunction with a status receiving device which monitors the transmitted data packets, the passive bus network system is monitored by the data transmitter and the data receiver in view of the presence of the line terminating impedances, the proper connection of the media adapter units to the transmission medium, as well as the transmitting and receiving functions and the collision recognition and state of the collision recognition circuit.

6 Claims, 6 Drawing Sheets

CIRCUIT ARRANGEMENT FOR TESTING A PASSIVE BUS NETWORK WITH THE CARRIER SENSE MULTIPLE ACCESS WITH COLLISIONS DETECTION METHOD

BACKGROUND OF THE INVENTION

1. Field of the Invention

The present invention relates to a circuit arrangement for testing a passive bus network comprising stations connectible to a coaxial cable segment via media adapter unit, the stations realizing the data packet exchange via the coaxial cable segment with the carrier sense multiple access with collisions detection (CSMA/CD) method.

2. Description of the Prior Art

As transmission media, passive bus networks of the type set forth above comprise coaxial cables to which the stations are connected via passive media adapter units. Due to the attenuation and the limited band width of the coaxial cable, the length of the coaxial cable segment is presently limited to about 500 m. The stations are connected to the media adapter units via special transmit/receive cable which are constructed as stranded lines whose length is limited to about 50 m for the same reasons.

The passive bus network operates according to the CSMA/CD principle. Included is that every station receives data packets from all other stations by way of the respectively appertaining media adapter unit. The term "multiple access" means that all stations of this passive bus network have equality of access to the bus network without central control. Transmission from the station via the correspondingly-appertaining media adapter can only be carried out when no data information are being exchanged via the passive bus network. The simultaneous transmission of a plurality of stations leads to what is referred to as collision. This situation is recognized by a collision recognition circuit in the media adapter unit of each tansmitting station by way of level monitoring at the transmission medium and leads immediately to the abort of the transmission of data. After a waiting period stochastically-defined in duration, the station again undertakes attempts at transmission.

For testing such passive bus networks, involved isolation and reflection measurements with time reflectometers are currently carried out only at the coaxial cable segment in order to be able to identify the proper operating condition of the transmission circuit. Given these types of test, no statements regarding the operating function of the stations connected to the coaxial cable segments are possible.

SUMMARY OF THE INVENTION

The object of the present invention is that, in testing the principle functions such as, for example, transmitting and receiving the data packets via the respective coaxial cable segment, as well as the error states given collision, and the collision recognition readiness of the respective media adapter units under conditions similar to operating conditions, are provided in advance upon installation of the passive bus network and in a simple manner.

According to the invention, the above object is achieved by the features of:

(1) The circuit arrangement comprises a data transmitter having a first amplifier coupled free of D.C. to the media adapter unit, the data transmitter being internally connectible by way of a switch and via a first line to a resonant stage and to a part device for generating the data packets with a defined bit rate and being externally connectible via a second line to a transmission input having an arbitrary data packet pulse sequence and an arbitrary bit rate;

(2) The circuit arrangement comprises a data receiver which is coupled free of D.C. to the media adapter unit, the data receiver transmitting the data packets received via an amplifier to a receiver output pulse-by-pulse by way of a first threshold circuit which suppresses noise pulses; and (3) The circuit arrangement is equipped with a status receive device which is coupled free of D.C. to the media adapter nit, the device monitoring the data packet reception with respect to the "collision" state and the "collision recognition circuit" (heartbeat signal) state, this device transmitting the heartbeat signal and the collision signal to a respective optical display device and a collision receive output by way of a second threshold circuit which presses noise pulses and by way of a decision stage formed of three one-shot multi- vibrators.

With the circuit arrangement of the invention, which in addition tothe data transmission and receiving devices, contains the status reception device with which the error state of the data collision and the recognition readiness within the media adapter unit can be checked, all switching states necessary for function checking can be generated in a simple manner and the corresponding switching sequences in the media adapter units connected to the coaxial cable segment can be produced in a simple manner. Coaxial cable segments which are also faulty in view of the terminating impedance can also be identified with the data reception device in that the data packets transmitted from the data transmitting device are received as undesired reflection signals. Media adapter units not communicating with the coaxial cable segment has prescribed can also be identified, without problems, by corresponding switching sequences or, respectively, the failure thereof.

When two of the circuit arrangements constructed in accordance with the present invention are connected in common to a coaxial cable segment, then what is referred to as collision recognition readiness of the installed media adapter unit can also be tested. By setting the second circuit arrangement only to data reception, a check can be carried out to see whether one of the media adapter units arbitrarily generates what is referred to as a heartbeat signal after the data packets have been received by the corresponding media adapter unit via the coaxial cable segment. On the basis of the decision stage formed of the three one-shot multivibrators, moreover, the heartbeat signal and the collision signal can be optically displayed within the circuit arrangement of the invention. It is to be considered essential to the invention that both the received data packets and the collision reception are accessible via corresponding outputs in order to be able to undertake further investigations of the corresponding signal inputs in combination with, for example, an oscilloscope.

In accordance with an advantageous feature of the invention, the switch facility of the data transmission device is also connected to a one-shot multivibrator so that the transmitted data packet pulse sequence can also be optically displayed, for example via a light emitting diode (LED) display. Moreover, the data packet pulse sequence can also be exploited as a trigger output signal for the connection of further measuring instruments.

A particular feature of the invention is characterized in that the amplifier of the data receiver is connected to a one-shot multivibrator for the optical display of the received data packet pulse sequences so that the received data packet pulse sequences can also be optically displayed within the data receiver.

BRIEF DESCRIPTION OF THE DRAWINGS

Other objects, features and advantages of the invention, its organization, construction and operation will be best understood from the following detailed description, taken in conjunction with the accompanying drawings, on which.

DESCRIPTION OF THE PREFERRED EMBODIMENTS

Figure 1:
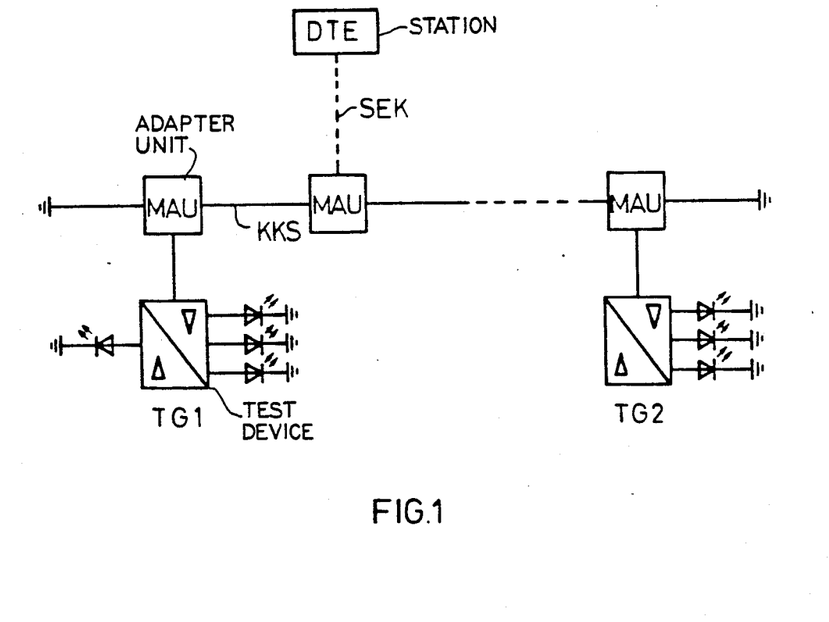
FIG. 1 is a schematic representation of a coaxial cable segment which directly connects media adapters to one another and in which each station is connected to a media adapter unit via a separate transmit/receive cable SEK in order to undertake data exchange with other stations.

Referring to FIG. 1, a coaxial cable segment KKS directly connects respective media adapter units MAU to one another. The coaxial cable is provided with a corresponding terminating impedance at both ends in order to annihilate the transmitted signals, free of reflection, at these locations. It is also shown that each station DTE is connected to the media adapter unit via a separate transmit/receive cable SEK in order to therefore be able to undertake the data exchange with other stations (not shown) via the coaxial cable segment KKS.

One of the possible test configurations has the appearance that a circular arrangement for testing the bus network system, as a test device TG1, is connected to the coaxial cable segment KKS via the media adapter unit MAU in the same manner as a station DTE and that a plurality of further media adapter units MAU, without connection to the stations, are in communication with the transmission medium. Damage to the coaxial cable segment or, respectively, the lack of a proper line terminating impedance can be identified by way of the designational transmission of the data packet information and a corresponding evaluation of the received signals. This is the case when, in the data transmission and the reception of the data, the collision state additionally occurs. A media adapter unit which is not properly connected would, on the other hand, be recognized in that the data reception is interrupted and, at the same time, the collision state is signaled within the test device TG1.

When a second test device TG2 is connected to the coaxial cable segment KKS, then the state of the collision recognition circuit of the media adapter unit MAU to be tested can be monitored in that the first test device TG1 transmits data and the second test device TG2 receives the data. When, despite the reception of the data packets from the media adapter unit MAU to be monitored, what is referred to as the heartbeat signal is not received, then the corresponding fault condition exists.

When the two test devices TG1 and TG2 are set to transmission of data, then the error state "collision" is generated on the coaxial cable segment KKS and can be read from the optical display device correspondingly present within the test devices TG1 and TG2.

Figure 2:
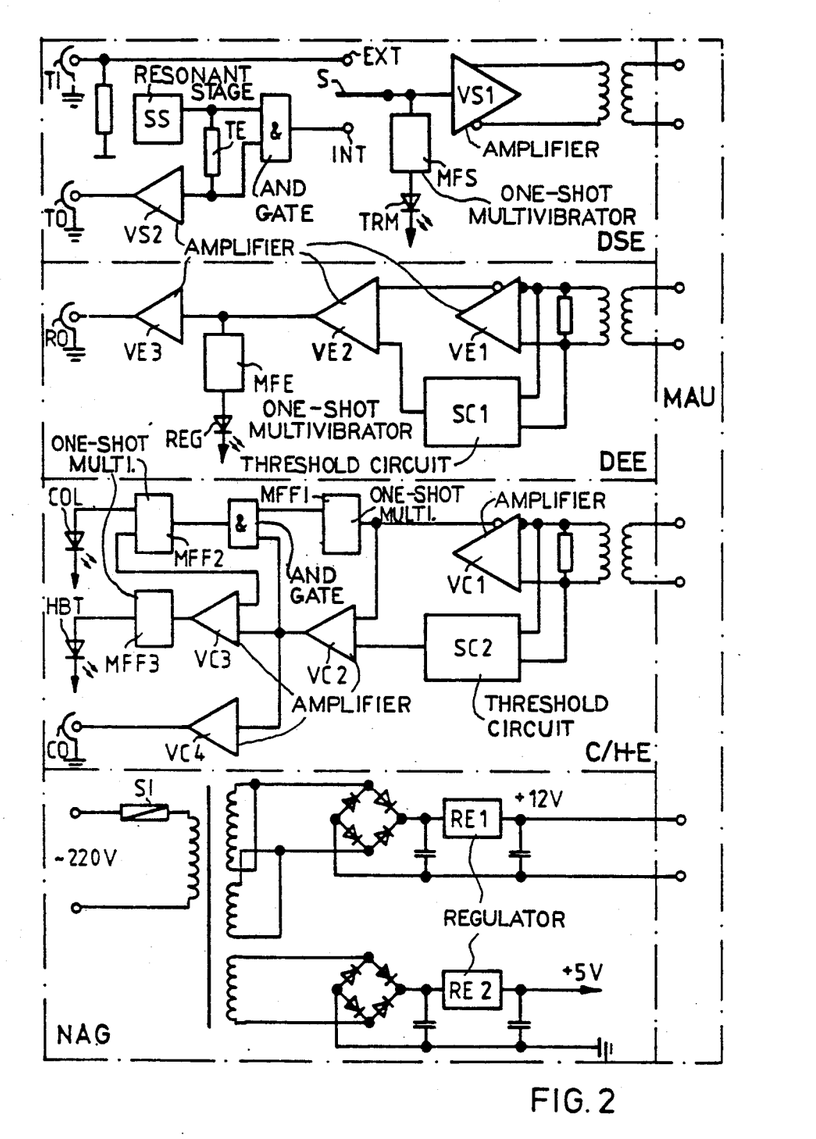
FIG. 2 is a schematic circuit diagram of a circuit arrangement constructed in accordance with the present invention.

FIG. 2 shows further details of the circuit arrangement of the invention which is essentially composed of a data transmission device DSE, a data receiving device DEE and a status reception device C/H-E. All devices are coupled free of DC to the media adapter unit MAU via repeaters or amplifiers (not shown in detail). The data transmission device DSE is equipped with a resonant stage SS which generates data packets having a defined bit rate via a first line INT with the assistance of a coupling device TE and of an AND gate. Insofar as a switch S is connected to the first line INT, the data packets having a defined bit rate are transmitted to the media adapter unit MAU via a first amplifer VS1. The switch S is also connected to a one-shot multivibrator MFS by way of which the transmitted data packet pulse sequences can be optically displayed with the assistance of a display device TRM.

The element TE is also followed by a second amplifier VS2 in order to be able to evaluate the data packet pulse sequence as what is referred to as a trigger signal TO. A second line EST is also provided in the data transmitter DSE, the second line EXT being connected to a transmission input TI having an arbitrary data packet pulse sequence and bit rate.

The data receiver DEE is equipped with a first threshold circuit SC1 which suppresses noise pulses and which, in combination with amplifiers VE1, VE2 and VE3 transmits the received data packets pulse-by-pulse to a reception output RO and, with the assistance of a receiving one-shot multivibrator MFE, emits the received data packet pulse sequences to an optical display device REC.

A status reception device C/H-E is also provided within the circuit arrangement, and supplies the heartbeat signal and the collision signal to further optical display devices HBT or, respectively, COL and, via a fourth amplifier VC4, to the collison reception output CO, the supply of these signals being by way of a second threshold circuit SC2 which suppresses noise pulses and by way of a status amplifier device including the amplifiers VC1, VC2, VC3 in combination with a decision circuit formed of three one-shot multivibrators MF1, MF2, MF3 and an AND gate.

The operational details of the corresponding devices shall be set forth in greater detail below. With the assistance of the switch S of the data transmitter DSE, there is a possibility of transmitting two types of data packets into the CSMA/CD bus network system via the transmit/receive cable SEK (shown in FIG. 1). When the switch S is connected to the first line INT, then the data packets generated within the data transmitter DSE can be generated, for example, with a bit rate of 10 Mbit/s and a packet length of 12.8 μs can be supplied into the corresponding transmit/receive cable SEK via an amplifier. The spacing between the data packets likewise amounts to 12.8 μs. The pulses required for this purpose are generated with a resonant stage SS which is constructed as a quartz oscillator. The pulses have a period duration of 200 ns given a pulse duty factor of 50%.

Due to the coupling element TE which is constructed as a two-stage element, the pulses are generated with a period of 25.6 μs, these simultaneously forming the frame signal. Furthermore, these pulses are made available to the trigger output TO for measuring purposes. The packet length is selected such that the minimally-prescribed packet length of 51.2 μs (IEEE Standard 802.3-1985) is fallen below in order, for example, to exclude stations accidentally connected during the test procedure from data reception and evaluation.

As soon as the switch S is connected to the second line EXT, the circuit arrangement can transmit arbitrary pulse sequences having an arbitrary bit rate via the bus network system for testing purposes, these pulses being transmitted with the assistance of a pulse generator. This output signal is supplied to the transmit/-receive cable SEK (FIG. 1) free of DC via the repeater or amplifier (not shown) in the same manner.

The data packets which proceed via the media adapter unit MAU onto the transmit/receive cable SEK are likewise conducted free of DC via the amplifier to the amplifiers VE1, VE2, VE3 of the data receiver DEE. Inadmissible noise pulses having an amplitude up to a maximum of 160 mVss are prevented from appearing at the corresponding output with the first threshold circuit SC1 which suppresses noise pulses. As long as the incoming pulses do not prescribed amplitude and duration, the first threshold circuit SC1 inhibits the further evaluation of the signal.

The status reception device C/H-E differs from the data receiver DEE on the basis of an additional decision circuit MFF2, MFF3 which identifies whether the received pulses correspond to the heartbeat or to a collision. The heartbeat signal is a self-test function of the media adapter unit which indicates the state of the collision recognition circuit in the connected station. This occurs by emitting a defined signal via the transmit/-receive cable after each data packet transmission which has been successfully transmitted.

The error state "collision" is present when two or more stations attempt to transmit simultaneously on the coaxial cable segment within the passive bus network system. This error state of collision can also be generated in the test mode for testing the bus network system by employing two test devices in that both test devices are set to transmission. As long as a media adapter unit recognizes the state of collision, this media adapter unit transmits the collision signal to the station or, respectively, to the connected test device via the transmit/-receive cable. The heartbeat signal and the collision signal are identical with respect to their electrical properties. For example, they have a frequency of 10 MHz and a pulse duty factor of about 50%. The difference between these two signals is only the signal duration. Whereas the heartbeat signal, for example, as a length of 1 μs, the length of the collision signal is theoretically unlimited for it is always generated as long as a data collision exits within the passive bus network system.

During the test, the test device behaves like the station and distinguishes only the incoming pulses with respect to their differing length. The state decision stage C/H-E is thereby composed of three one-shot multivibrators MFF1, MFF2 and MFF3 and of two LED displays. Since, due to the frequency of the repeating data packets, the heartbeat pulses have a higher probability of occurrence, the principal check carried out is to see whether the incoming pulses form the heartbeat signal HBT at the status reception device. For this purpose, the first incoming pulse blocks the second oneshot multivibrator MFF2, for example for 5 μs, to control the collision display and open the third one-shot multivibrator MFF3 for 5 μs, this latter multivibrator making the heartbeat signal optically identifiable on the corresponding LED display HBT. The first one-shot multivibrator MFF1 is employed as a delay element which generates the time t=5 μs and which is directly controlled by the first amplifier VC1. The first pulses processed in the decision stage are the pulses which correspond to the standard in amplitude and duration (this is checked with the assistance of the second threshold circuit SC2 which suppresses noise pulses). As long as the collision signal duration is shorter than 5 μs, the second one-shot multivibrator does not change in state, so that the third one-shot multivibrator drives the LED display HBT. When the collision signal duration exceeds the time interval of 5 μs, the second one-shot multivibrator MFF2 changes state, and thereby drives the LED display COL and simultaneously inhibits the input of the third one-shot multivibrator MFF3.

The power supply unit NAG generates two separate DC voltages in a known manner, whereby the first DC voltage of, for example, +12 V serves for supplying the media adapter unit MAU, and the second DC voltage of, for example, +5 V serves for supplying the data transmitter and receiver DSE, DEE and the status reception device C/H-E.

Figure 3:
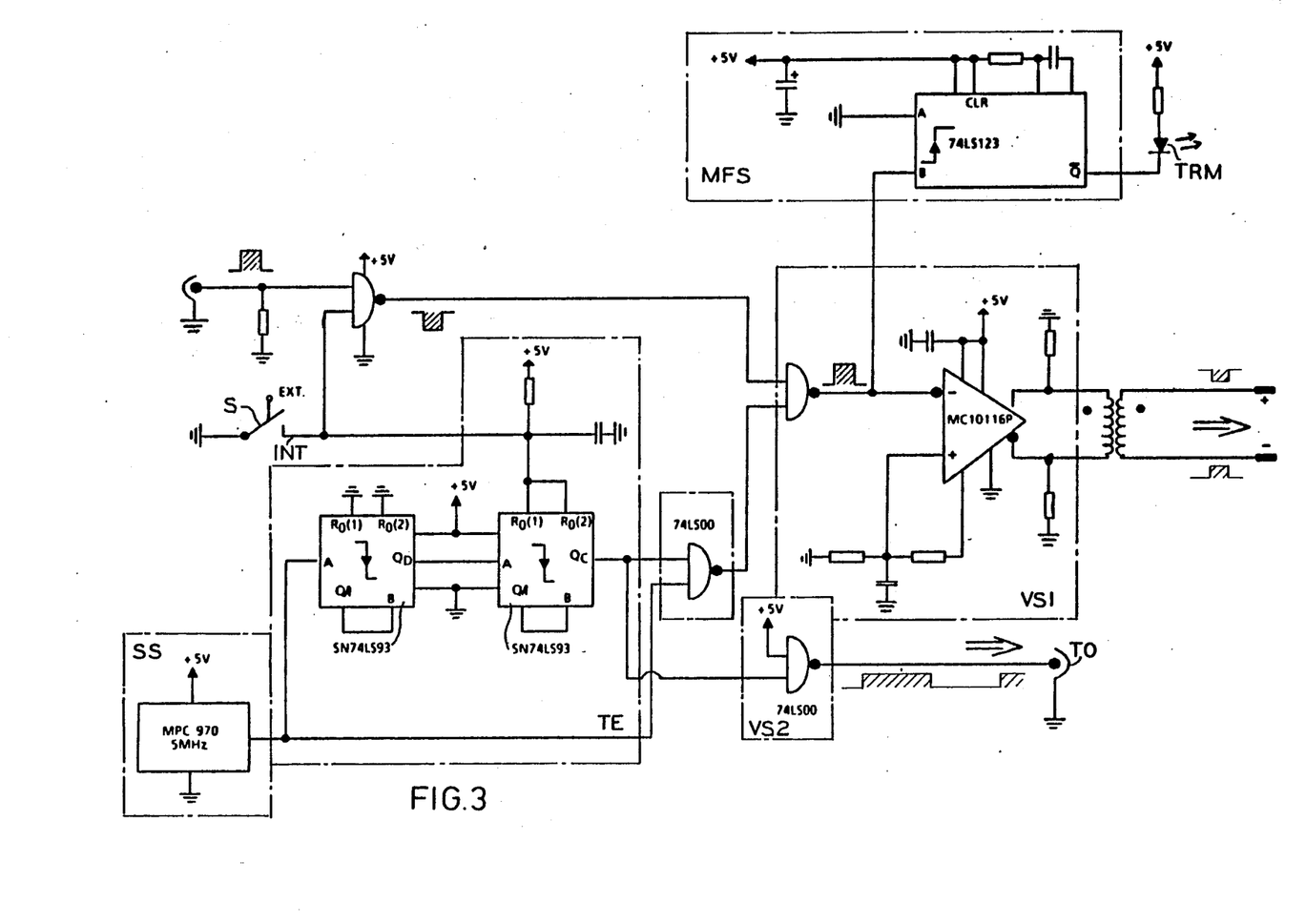
FIG. 3 is a schematic circuit diagram of a transmitter.
Figure 4:
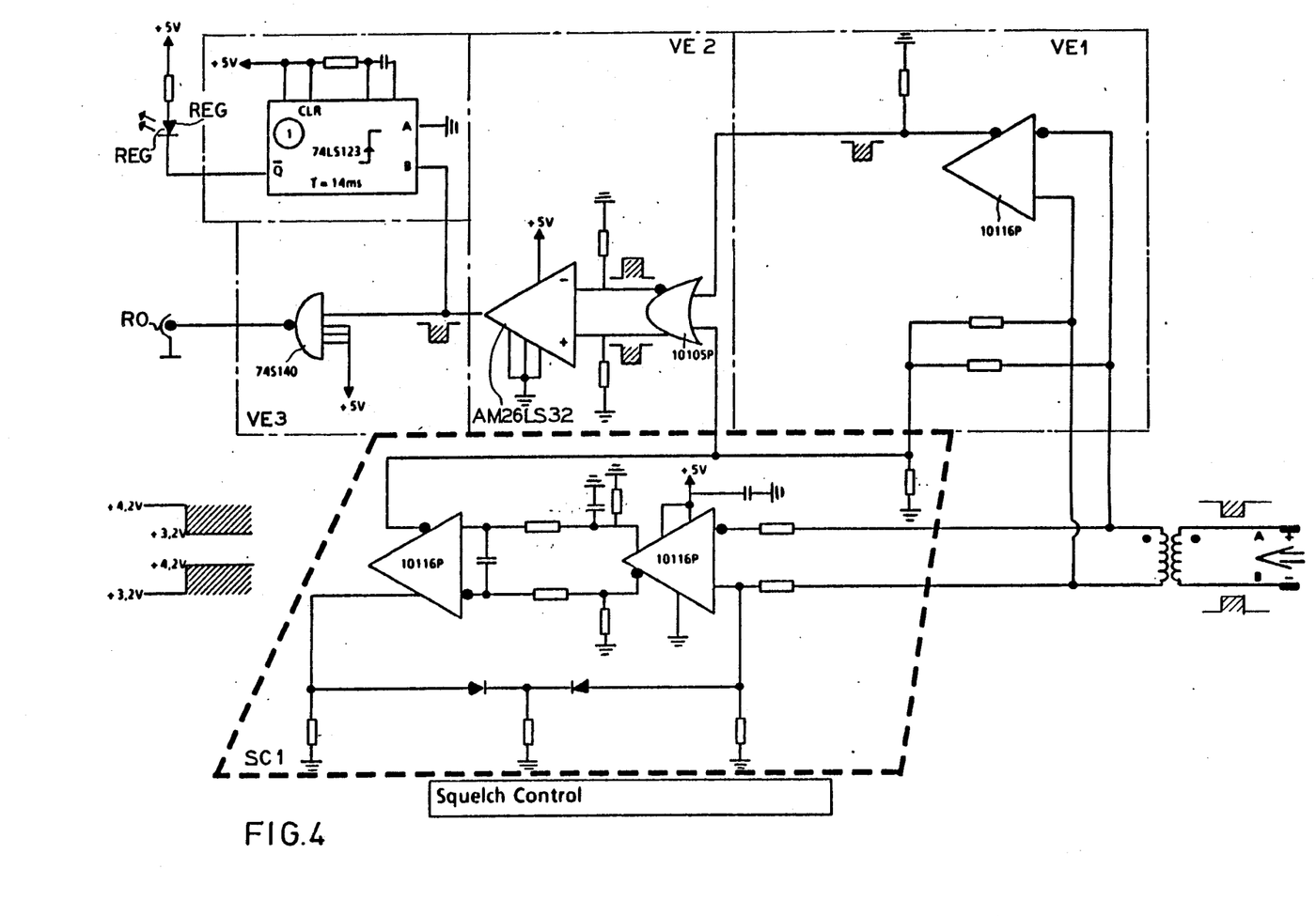
FIG. 4 is a schematic circuit diagram of a receiver.
Figure 5:
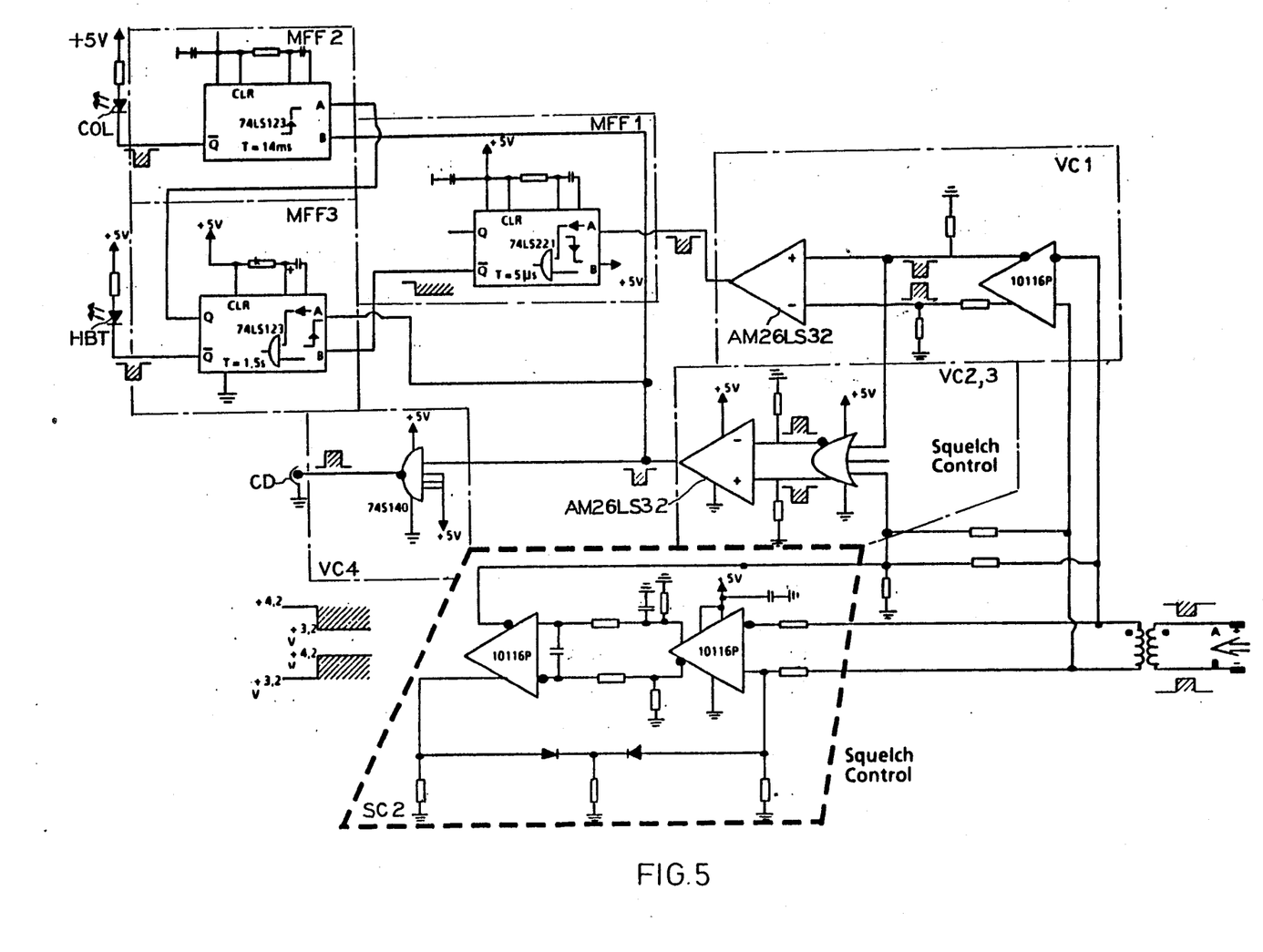
FIG. 5 is a schematic circuit diagram of a status receive device.
Figure 6:
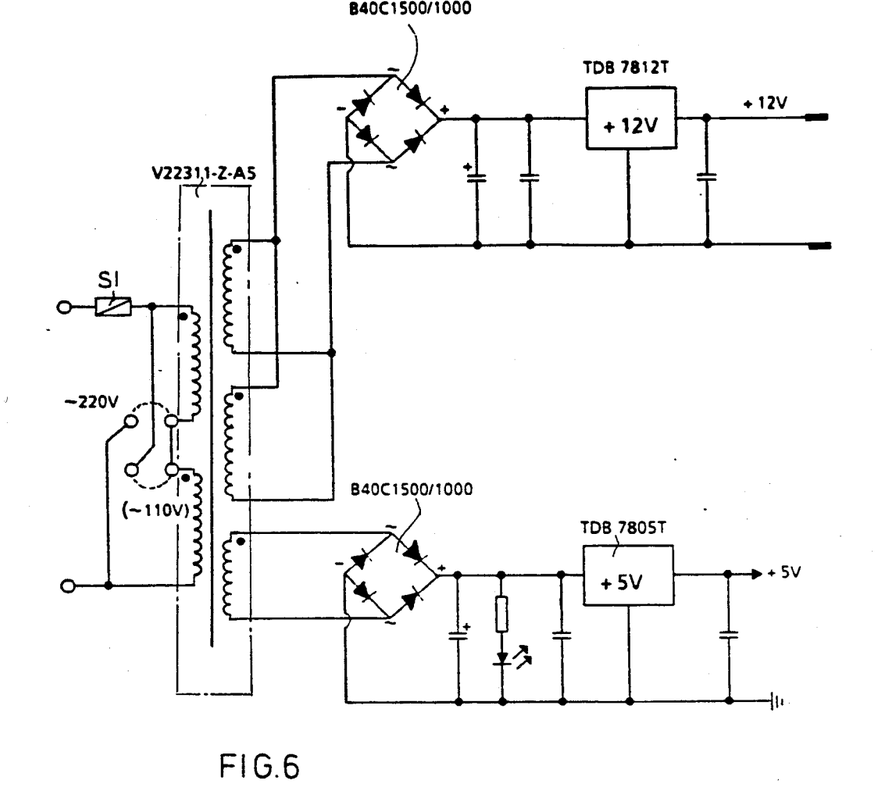
FIG. 6 is a schematic circuit diagram of an exemplary embodiment of the power supply.

FIG. 3 illustrates the data transmitter DSE and illustrates standard components which may be employed in constructing the transmitter. FIG. 4 illustrates the data receiver DEE and also illustrates standard components which may be employed in constructing the data receiver. FIG. 5 illustrates, with standard components, the status receiving device C/H-E and, in the same manner, FIG. 6 illustrates the components and structure of the power supply unit NAG.

Although we have described our invention by reference to particular illustrative embodiments thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. A circuit arrangement for testing a passive bus network system which comprises a plurality of stations each connectible to a coaxial cable segment via a respective media adapter unit, the stations operable for data packet exchange via the coaxial cable segment in accordance with the carrier sense multiple access with collision detection access method to detect a collision state and a heartbeat state, said circuit arrangement comprising:

a data transmitter including a first amplifier unit means comprising an output coupled DC free to the respective media adapter unit and an input, a data packet generator including a resonator and a trigger circuit connected to said resonator for generating data packets with a defined bit rate, an external data input for receiving data packets having an arbitrary data packet pulse sequence and an arbitrary bit rate, and a switch connected to said input of said first amplifier unit means and operable to selectively connect said data packet generator and said external data input to said first amplifier unit means;

a data receiver including a first amplifier means including an input coupled DC free to the respective media adapter and an output, second amplifier means including a first input connected to said output of said first amplifier means, a second input and an output, a data output, third amplifier means including an input connected to said output of said second amplifier means and an output connected to said data output, and a first threshold circuit including an input connected DC free to the respective media adapter unit and an output connected to said second input of said second amplifier means and operable to suppress noise pulses; and status receive means including first amplifying stage means including an input coupled DC free to the respective media adapter unit and an output, second amplifying stage means including a first input connected to said output of said first amplifying stage means, a second input and an output, a second threshold circuit including an input coupled DC free to the respective media adapter unit and an output connected to said second input of said second amplifying stage means and operable to suppress noise pulses; and status receive means operable to monitor the data packet reception with respect to the collision state and the heartbeat state producing respective collision and heartbeat signals and further comprising a collision display device, a heartbeat display device, a collision output, a decision stage connected between said output of said first amplifying stage means and said output of said second amplifying stage means and said collision display device and heartbeat display device, and a third amplifying stage means including an input connected to said output of said second amplifying stage means and an output connected to said collision output.

2. The circuit arrangement of claim 1, wherein:
multivibrator including an input connected to said output of saif first amplifying stage means and an output, an AND gate including a first input connected to said output of said first one-shot multivibrator, a second input connected to said output of said second amplifying stage means and an output, a second one-shot multivibrator including an input connected to said output of said AND gate, a first output connected to said collision display device and a second output, third amplifying stage means including an input connected to said second output of said second one-shot multivibrator, a second input connected to said output of said second amplifying stage means and an output, and a third one-shot multivibrator including an input connected to said output of said third amplifying stage means and an output connected to said heartbeat display devive.

3. The circuit arrangement of claim 1, and further comprising:
a power supply unit including first means for generating a first supply voltage of a first magnitude for said media adapter unit and second means for generating a second supply voltage of a second magnitude for said data transmitter, said data receiver and said status receive means.

4. The circuit arrangement of claim 1, wherein said data transmitter further comprises:
a transmission display device; and
a one-shot multivibrator including an output connected to said transmission display device and an input connected to said switch.

5. The circuit arrangement of claim 1, wherein:
said data transmitter further comprises a trigger output and a second amplifier unit means including an input connected to said trigger circuit and an output connected to said trigger output.

6. The circuit arrangement of claim 1, wherein:
said data receiver further comprises a receive display device and a one-shot multivibrator including an input connected to said output of said second amplifier means and an output connected to said receive display device.

* * * * *